(12) United States Patent
Ehlers

(10) Patent No.: US 8,478,896 B2
(45) Date of Patent: *Jul. 2, 2013

(54) DATA PACKET ENCAPSULATION METHODS

(75) Inventor: John Ehlers, Chandler, AZ (US)

(73) Assignee: Comtech EF Data Corp., Tempe, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/363,262

(22) Filed: Jan. 31, 2012

(65) Prior Publication Data

US 2012/0137020 A1 May 31, 2012

Related U.S. Application Data

(63) Continuation of application No. 12/398,855, filed on Mar. 5, 2009, now Pat. No. 8,108,546.

(60) Provisional application No. 61/121,938, filed on Dec. 12, 2008.

(51) Int. Cl.
- *G06F 15/16* (2006.01)
- *H04J 3/24* (2006.01)
- *H04L 12/28* (2006.01)

(52) U.S. Cl.
USPC ........... 709/236; 709/232; 709/250; 370/349; 370/389

(58) Field of Classification Search
USPC .................. 709/232, 236, 250; 370/349, 389
See application file for complete search history.

(56) References Cited

U.S. PATENT DOCUMENTS

| | | | | |
|---|---|---|---|---|
| 6,356,951 B1 * | 3/2002 | Gentry, Jr. | .................... | 709/250 |
| 7,664,092 B2 * | 2/2010 | Birdwell et al. | ............... | 370/349 |
| 7,773,578 B2 * | 8/2010 | Liu | ................................ | 370/351 |
| 8,108,546 B2 * | 1/2012 | Ehlers | ........................... | 709/236 |
| 2004/0260829 A1 * | 12/2004 | Husak et al. | .................. | 709/232 |
| 2005/0099991 A1 * | 5/2005 | Birdwell et al. | ............... | 370/349 |
| 2006/0274747 A1 * | 12/2006 | Duchscher et al. | ........... | 370/389 |
| 2008/0075099 A1 * | 3/2008 | Alao et al. | ..................... | 370/401 |
| 2008/0198787 A1 * | 8/2008 | Nguyen | ......................... | 370/315 |
| 2009/0307727 A1 * | 12/2009 | Thesling | ......................... | 725/63 |

* cited by examiner

*Primary Examiner* — Emmanuel L Moise
*Assistant Examiner* — Vitali Korobov
(74) *Attorney, Agent, or Firm* — Booth Udall Fuller, PLC

(57) ABSTRACT

A data encapsulation system and related methods. Implementations may include: forming at least one frame having a data payload, a data sequence, and one or more control bytes; evaluating data to be stored in the data payload and setting a value of the one or more control bytes, where the value of the one or more control bytes may be equal to: a first control byte value where one or more values of the data correspond with the first control byte value; a second control byte value indicating a size of the data; or a third control byte value where one or more values of the data continue beyond the frame. The value of each one of the one or more control bytes for each of the at least one frames may be equal to either the first, second, or third control byte values.

15 Claims, 18 Drawing Sheets

DATA PACKET ENCAPSULATION METHODS

CROSS REFERENCE TO RELATED APPLICATIONS

This application is a continuation application of the earlier U.S. patent application Ser. No. 12/398,855, entitled "Data Packet Encapsulation Methods" to John Ehlers which was filed on Mar. 5, 2009, now pending, which claims the benefit of the filing date of U.S. Provisional Patent Application No. 61/121,938, entitled "Streamlined Packet Encapsulation" to John Ehlers which was filed on Dec. 12, 2008, the disclosures of which are hereby incorporated entirely herein by reference.

BACKGROUND

1. Technical Field

Aspects of this document relate generally to methods for transmitting data across a telecommunication network.

2. Background Art

Telecommunication networks utilize a wide variety of infrastructure types and methods for transmitting data. The choice of a particular method depends upon a variety of factors including the bandwidth of the connection, the type of data being transmitted, the need of security for the data, the routing of the signals between the source and the destination, and many other considerations. Many conventional methods divide the transmitted data into packets that include header information that is used by the network during the transmission process. Other conventional methods divide the transmitted data into frames that also include header information. The use of frames at the data link layer to transport a data payload from a packet is conventionally referred to as "encapsulating" the data. Examples of conventional encapsulation methods include High-Level Data Link Control (HDLC), Point-to-Point Protocol (PPP) in HDLC-like framing (Internet Engineering Task Force RFC 1662), Multiprotocol Encapsulation (MPE), Generic Stream Encapsulation (GSE), and Unidirectional Lightweight Encapsulation (ULE).

SUMMARY

Implementations of data encapsulation systems described in this document may utilize implementations of a first method of data encapsulation. The method may include forming at least one frame where each frame includes a data payload configured to store data and a data sequence, and including one or more control bytes in the data sequence of the frame. The method may also include evaluating the data to be stored in the data payload associated with the frame and setting a value of the one or more control bytes in response to the data evaluation. The value of the one or more control bytes may be equal to a first control byte value which indicates that one or more values of the data in the data payload following the control byte in the data sequence of the frame corresponds with the first control byte value. The value of the one or more control bytes may also be equal to a second control byte value indicating a size of the data in the data payload following the control byte in the data sequence of the frame. The value of the one or more control bytes may also be equal to a third control byte value which indicates whether one or more values of the data continue into a data payload of at least a next frame. The value of each one of the one or more control bytes for each of the at least one frame may be equal to either the first control byte value, the second control byte value, or the third control byte value.

Implementations of a first method of data encapsulation may include one, all, or any of the following:

Including one or more control bytes in the data sequence of the frame may further include mapping one of one or more fields included in a header included in the frame to a value of a control byte indicator and setting the value of the control byte indicator to a first value to indicate that a control byte will exist or to a second value, different from the first value, to indicate that a control byte will not exist. The method may also include including the one or more control bytes in the data sequence of the frame following the header if the value of the control byte indicator is equal to the first value.

Setting the value of the control byte indicator may further include setting the first value of the control byte indicator to one and the second value of the control byte indicator to zero.

Implementations of data encapsulation systems disclosed in this document may utilize a second method of data encapsulation. Implementations of the second method may include forming at least one frame, each frame having a data payload, a data sequence, and a frame delimiter with at least a first value and a second value different from the first value. The method may include setting the value of the frame delimiter to the first value to indicate that a control byte will exist or to the second value to indicate that a control byte will not exist and including one or more control bytes in the data sequence of the frame following the frame delimiter if the value of the frame delimiter is equal to the first value. The method may also include evaluating the data to be stored in the data payload associated with the frame and setting a value of the one or more control bytes in response to the data evaluation. The value of the one or more control bytes may be equal to a first control byte value indicating that one or more values of the data in the data payload following the control byte in the data sequence of the frame corresponds with the first control byte value. The value of the one or more control bytes may also be equal to a second control byte value indicating a size of the data in the data payload following the control byte in the data sequence of the frame. The value of the one or more control bytes may also be equal to a third control byte value indicating whether one or more values of the data continue into a data payload of at least a next frame. The value of each one of the one or more control bytes for each of the at least one frames may be equal to either the first control byte value, the second control byte value, or the third control byte value.

Implementations of a second method of data encapsulation may include one, all, or any of the following:

Setting the value of the one or more control bytes in response to the data evaluation may further include setting the first value of the frame delimiter to 0xC7 (11000111) and setting the second value of the frame delimiter to 0x47 (01000111).

Implementations of data encapsulation systems disclosed in this document may utilize a third method of data encapsulation. Implementations of the third method may include forming a plurality of frames, each frame including a data payload, a data sequence, and a frame delimiter having at least a first value and a second value different from the first value. The method may also include setting one or more values of the frame delimiter of each of the plurality of frames to the first value to indicate that a control byte will exist or to the second value to indicate that a control byte will not exist. For each frame of the plurality of frames, the method may include including one or more control bytes in the data sequence of the frame following the frame delimiter if the value of the frame delimiter is equal to the first value. The method may also include evaluating the data to be stored in the data payloads of the plurality of frames and setting a value of the one or more control bytes in the first frame, a second frame, and a third frame of the plurality of frames in response to the data evaluation. The value of the one or more control bytes in the first frame may be equal to a first control byte value indicating that one or more values of the data in the data payload following the control byte in the data sequence of the frame correspond with the first control byte value. The value of the one or more control bytes in the second frame may be equal to a second control byte value indicating a size of the data in the data payload following the control byte in the data sequence of the second frame. The value of the one or more control bytes in the third frame may be equal to a third control byte value indicating that one or more values of the data continue into a data payload of at least a next frame of the plurality of frames.

Implementations of data encapsulation systems disclosed in this document may utilize a fourth method of data encapsulation. Implementations of the fourth method may include forming a plurality of frames each having a data payload and a data sequence and evaluating the data to be stored in the data payloads of the plurality of frames and including one or more control bytes in the data sequence of the at least one frame of the plurality of frames and setting a value of the one or more control bytes in the at least one frame in response to the data evaluation. The value of the one or more control bytes in the at least one frame may be equal to a first control byte value indicating that one or more values of the data in the data payload following the control byte in the data sequence of the at least one frame correspond with the first control byte value. The value of the one or more control bytes in the at least one frame may be equal to a second control byte value indicating a size of the data in the data payload following the control byte in the data sequence of the at least one frame. The value of the one or more control bytes in the at least one frame may be equal to a third control byte value indicating that one or more values of the data continue into a data payload of at least a next frame of the plurality of frames.

Implementations of a fourth method of encapsulating data may include one, all, or any of the following:

Forming the plurality of frames may further include including a frame delimiter in each of the plurality of frames where the frame delimiter has at least a first value and a second value different from the first value. Evaluating the data to be stored in the data payloads of the plurality of frames may include setting one or more values of the frame delimiter of each of the plurality of frames to the first value to indicate that a control byte will be included in the at least one frame or to the second value to indicate that a control byte will not be included in the at least one frame. For the at least one frame, the method may also include including one or more control bytes in the data sequence of the at least one frame following the frame delimiter if the value of the frame delimiter is equal to the first value.

Forming the plurality of frames may further include mapping one of one or more fields included in a header included in each of the plurality of frames to a value of a control byte indicator. Evaluating the data to be stored in the data payloads of the plurality of frames may further include setting the value of the control byte indicator to a first value to indicate that a control byte will be included in the at least one frame or to a second value, different from the first value, to indicate that a control byte will not be included in the at least one frame. The method may also include including the one or more control bytes in the data sequence of the at least one frame following the header if the value of the control byte indicator is equal to the first value.

Implementations of data encapsulation systems and implementations of methods of data encapsulation methods disclosed in this document may utilize implementations of methods of evaluating data for a method of data encapsulation. The method may include receiving a size of the data to be stored in bytes and receiving a size of the data payload of a frame in bytes. If the size of the data to be stored is less than the size of the data payload and no more data will be stored in the data payload, the method may include setting a value of a control byte to a first control byte value and including the control byte in the data payload to indicate that one or more values of the data in the data payload following the control byte correspond with the first control byte value. If the size of the data to be stored is less than the size of the data payload, the method may further include setting the value of the control byte to a second control byte value indicating the size of the data in the data payload and including the control byte in the data payload. If the size of the data to be stored is greater than the size of the data payload, the method may further include setting a value of a control byte to a third control byte value and including the control byte in the data payload to indicate that one or more values of the data in the data payload continue into a data payload of at least a next frame.

Implementations of a method of evaluating data for a method of data encapsulation may include one, all, or any of the following:

Setting the value of the control byte may further include setting the first control byte value to 255 (0xFF), setting the second control byte value to the size of the data in bytes, and setting the third control byte value to 0 (0x00).

Implementations of methods of data encapsulation and implementations of data encapsulation systems disclosed in this document may utilize implementations of a frame adapted for transporting data across a telecommunication channel. Implementations of the frame may include a data sequence, a data payload, and a control byte. The control byte may have a first value indicating that the values of data in the data payload correspond with the first value. The control byte may have a second value indicating a size of the data in the data payload following the control byte in the data sequence of the frame. The control byte may have a third value indicating the values of the data continue into a data payload of a next frame.

Implementations of a frame adapted to transporting data across a telecommunication channel may include one, all, or any of the following:

The frame may include a header having one or more fields and a control byte indicator having a first value and a second value where the value of the control byte indicator is mapped to one of the one or more fields. When the control byte indicator is set to a first value, a control byte may be included in the frame after the control byte indicator in the data sequence of the frame. When the control byte indicator is set to a second value, a control byte may not be included within the data sequence of the frame.

The first value of the control byte indicator may be one and the second value of the control byte indicator may be zero.

The control byte indicator may include a single bit value and may be included within a Payload Unit Start Indicator field included in the header.

The control byte indicator may be a frame delimiter configured to indicate the beginning of the frame.

The first value of the control byte indicator may be 0xC7 (11000111) and the second value of the control byte indicator may be 0x47 (01000111).

The first value of the frame delimiter may be 0x7E (01111110) and the second value of the frame delimiter may be 0x7D (01111101).

The frame may be a Motion Picture Experts Group (MPEG) frame.

Expected length values of the control byte may include 1 to 183, 0, and 255 and unexpected length values of the control byte include 184 to 254.

The first value of the control byte may be 255 (0xFF), the second value of the control byte may be the size of the data in bytes, and the third value of the control byte may be 0 (0x00).

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

This disclosure, its aspects and implementations, are not limited to the specific components or assembly procedures disclosed herein. Many additional components and assembly procedures known in the art consistent with the intended data encapsulation system and/or assembly procedures for a data encapsulation system will become apparent for use with particular implementations from this disclosure. Accordingly, for example, although particular implementations are disclosed, such implementations and implementing components may comprise any shape, size, style, type, model, version, measurement, concentration, material, quantity, and/or the like as is known in the art for such data encapsulation systems and implementing components, consistent with the intended operation.

Figure 1A:
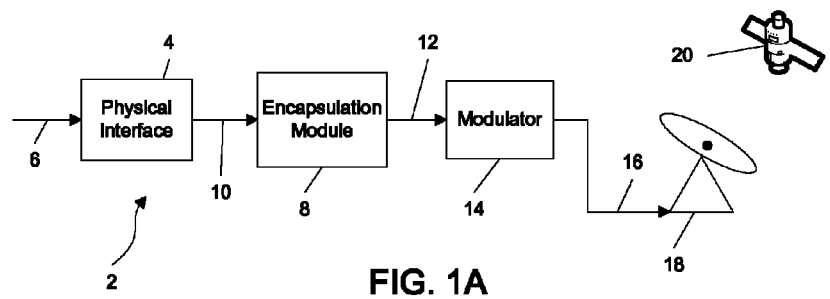
FIG. 1A is a block diagram of an implementation of the sending side of an implementation of a data encapsulation system.

Referring to FIG. 1A, an implementation of the sending side of a data encapsulation system 2 is illustrated. Implementations of sending sides 2 may be located in the transmission path of any of a wide variety of modem types, including, by non-limiting example, satellite modems, telephone modems, optical modems, or any other modem device. As illustrated, the sending side 2 includes a physical interface 4 to which a media connection 6 is coupled. Media connection 6 may be any of a wide variety of input types and formats, including, by non-limiting example, wire, parallel cable, twisted pair line, copper Ethernet, fiber optic Ethernet, Wireless Fidelity (Wi-Fi®) radio, Asynchronous Transfer Mode (ATM), synchronous serial, V.35 standard synchronous serial, and any other physical input type and/or input format. Physical interface 4 converts data in the media connection 6 into data packets of any of a wide variety of formats, including, by non-limiting example, Ethernet, Voice over IP (VoIP), or any other datagram type and transmits them to encapsulation module 8 over packet stream 10.

Encapsulation module 8 may utilize one, any, or all of the implementations of methods of data encapsulation or methods of evaluating data for a method of data encapsulation described in this document to produce encapsulated stream 12. Encapsulated stream 12 may include one or more frames like any of the many implementations disclosed in this document. In the implementation of the sending side 2 illustrated in FIG. 1A, the encapsulated stream 12 is received by modulator 14 that may perform any of a wide variety of modulation functions, including, by non-limiting example, digital-to-analog conversion, filtering, symbol mapping, forward error correction, scrambling, interleaving, baseband framing or any other digital and/or analog modulation function. The modulator 14 forms a radio frequency (RF) output 16 that may be sent in particular implementations to satellite transmitting station 18 and on to satellite 20. In other implementations, the radio frequency output 16 may be sent to any of a wide variety of other transmitters or modems, including, by non-limiting example, radio transmitters, Wireless Fidelity radios, walkie-talkies, cellular telephone networks, telephone networks, and any other telecommunication network type and data transfer device.

Figure 1B:
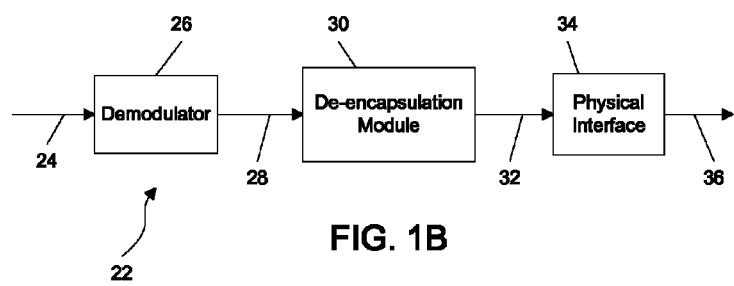
FIG. 1B is a block diagram of an implementation of the receiving side of an implementation of a data encapsulation system.

Referring to FIG. 1B, an implementation of a receiving side of an implementation of a data encapsulation system 22 is illustrated. Implementations of receiving sides 22 may be located in the reception path of any of the modem types previously discussed. As illustrated, the receiving side 22 includes an RF input stream 24 that is processed by demodulator 26 to produce encapsulated stream 28. Demodulator 26 may perform any of a wide variety of demodulation function, including, by non-limiting example, filtering, de-symbol mapping, de-framing, de-interleaving, descrambling, forward error correction decoding, and any other demodulation function. Encapsulated stream 28 is processed by de-encapsulation module 30 which may utilize any of many implementations of the methods of data encapsulation and/or methods of analyzing data for a method of data encapsulation described in this document, except that the method steps may be reversed and/or focused on recovering the packets contained in the encapsulated stream 28. De-encapsulation module 30 produces packet stream 32 which is received by physical interface 34 and output to media connection 36, which may be any of the media connection types previously disclosed in this document.

Figure 1C:
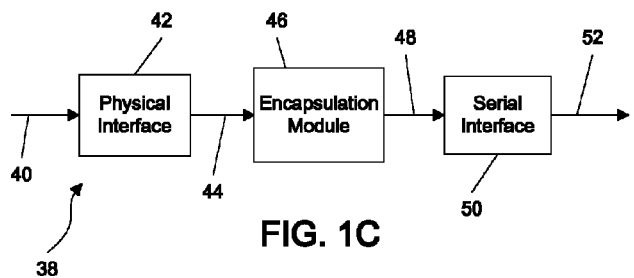
FIG. 1C is a block diagram of another implementation of the sending side of an implementation of a data encapsulation system.

Referring to FIG. 1C, another implementation of a sending side of a data encapsulation system 38 is illustrated, which may be located in the transmission path of a packet to serial media conversion device, such as a router with a serial interface or other serial interface-containing device. Like the sending side implementation 2 illustrated in FIG. 1A, the sending side 38 includes a media input 40, a physical interface 42, a packet stream 44, and encapsulation module 46, and encapsulated stream 48, each of which may operate substantially as described for the implementation illustrated in FIG. 1A. The sending side 38 also includes a serial interface 50 which is configured to receive the encapsulated stream 48 and produce a serial stream 52 in any of a wide variety of serial data transmission formats, including, by non-limiting example, V.35, Recommended Standard (RS)-232, RS-422, RS-485, Electronic Industries Alliance (EIA)-530 or any other serial data transmission format and/or protocol. In particular implementations, serial stream 52 may be received by a modulator; in other implementations, serial stream 52 may be directly transmitted across a serial data connection.

Figure 1D:
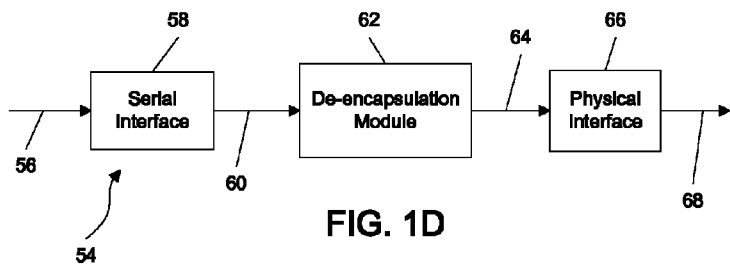
FIG. 1D is a block diagram of another implementation of the receiving side of an implementation of a data encapsulation system.

Referring to FIG. 1D, another implementation of a receiving side of a data encapsulation system 54 is illustrated, which may be in the reception path of a serial to packet media conversion device, such as a router or other serial interface-containing device. Receiving side implementations 54 include a serial stream 56 received by serial interface 58. Serial interface 58 may be any of the serial interface types previously disclosed in this document and may provide conversion capability to any of those interface types. Serial interface 58 produces encapsulated stream 60 which is received by de-encapsulation module 62. De-encapsulation module 62 may operate similarly to the de-encapsulation module 30 of the implementation illustrated in FIG. 1B. Implementations of receiving sides 54 also include a packet stream 64 produced by the de-encapsulation module 62 and a physical interface 66 that receives the packet stream 64 and outputs media connection 68. The various connection and/or input types, encapsulation/de-encapsulation methods, and data formats and/or algorithms utilized in implementations of receiving sides 54 may be any disclosed in this document.

Figure 2:
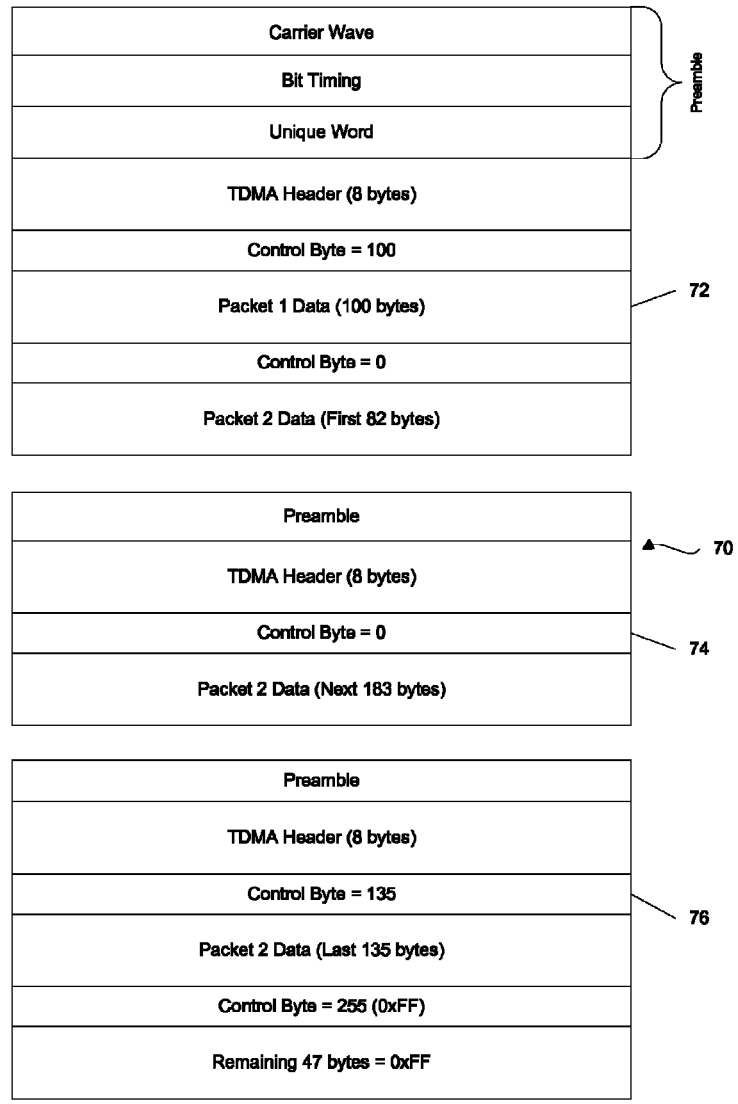
FIG. 2 is a diagram of an implementation of a first implementation of a frame showing various uses of control bytes.

Implementations of data encapsulation systems may utilize a wide variety of frame types and structures to encapsulate and de-encapsulate encapsulated streams using encapsulation and de-encapsulation modules. The following examples of frame structures also illustrate the results of the operation of implementations of various methods of data encapsulation disclosed in this document. Referring to FIG. 2, an implementation of a portion of an encapsulated stream 70 with three frames 72, 74, and 76 is illustrated. The frames 72, 74, and 76 illustrate a first implementation of a frame that may be utilized by implementations of data encapsulation systems disclosed in this document. In some implementations, the frame implementations 72, 74, and 76 illustrated in FIG. 2 may be utilized in a Time Division Multiple Access (TDMA) enabled telecommunication system, such as, by non-limiting example, a satellite, cellular telephone, or other radio telecommunication system. While the word "frame" is used in this document to refer to the individual datagrams being transported within the encapsulated stream, the term "burst" is synonymous. As illustrated, each frame includes a preamble which includes a carrier wave (CW) sequence, a bit timing clock training sequence, and a unique word (UW). The CW sequence permits recovery of the particular carrier frequency by the demodulator, the bit timing clock training sequence is used to recover the specific clock timing of the signal, and the unique word is used to identify the end of the preamble sequence. While all of the preambles illustrated in FIG. 2 contain these elements, the preamble has been summarized in frames 74 and 76. Any of a wide variety of conventional CW sequences, bit timing sequences and unique words could be utilized in particular implementation of data encapsulation systems. In implementations of data encapsulation, conventional preamble structures may be used; in other implementations, preamble structures adapted specifically for use with a data encapsulation system may be utilized.

As illustrated, a TDMA header follows the preamble in the frame structure. The TDMA header may contain any of a wide variety of different user-defined parameters that provide information about the telecommunication network and/or application-specific parameters including, by non-limiting example, the source of the frame or burst, bandwidth requests, operational status, or any other desired parameter. In implementations of data encapsulation systems, conventional TDMA header types and information may be utilized or specifically adapted TDMA header types and/or information may be included adapted for use with data encapsulation system implementations.

As illustrated in FIG. 2, following the TDMA header may be one or more control bytes followed by a data payload or data space within the sequence of data in the frame. A control byte is a single byte of data that may take on either of three values. A first value may indicate that one or more values of the data in the data payload following the control byte in the data sequence of the frame correspond with the first control byte value. An example of a first value for the control byte is decimal 255 or hexadecimal 0xFF, or null, indicating that all of the data values in the data sequence of the frame following the control byte are also null, or correspond with the first control byte value (see the last control byte in frame 76). However, in various implementations, if the first value of the control byte is 255, the remaining bytes may be null filler bytes that may be any other value or sequence of values that indicate that no data is present in the remaining portion of the frame. For example, the values of the null filler bytes could be an incrementing sequence of numerical values (i.e., 1, 2, 3, 4, 5, etc.) or a sequence of ASCII characters (i.e., A, B, C, D, etc). Any of a wide variety of values and value sequences may be used and/or defined as null filler bytes that correspond with, or are placed in the frame when the control byte has a particular predetermined value (which could include 0xFF or any other value). Accordingly, while the examples in this document use the value 255 as the first value of the control byte, any other byte value could be used in particular implementations and the remaining null filler bytes could also be any other value or sequence of values. A second value of the control byte indicates the size of the data in the data payload following the control byte in the data sequence of the frame. For example, in FIG. 2, in frame 76, the control byte has the decimal value 135, indicating that the next 135 bytes of the data sequence of the data payload will include packet data. A third value of the control byte indicates whether one or more values of the data continue into the data payload of at least a next frame, i.e., the remaining data from a packet is larger than the remaining size or total size of the data payload of a the frame (see the second control byte in frame 72, illustrating how data values from Packet 2 are larger than the remaining capacity of the data payload of frame 72 and continue into the data payload of frame 74, also see the control byte in frame 74, illustrating how remaining data values from Packet 2 are larger than the capacity of the data payload of frame 74 and continue into the data payload of frame 76).

In various implementations of frames 72, 74, and 76, the size of the frame in bytes may be fixed, or the same. In other implementations, each or a certain number of the frames in the encapsulation stream 70 may have varying frame sizes. Implementations of data encapsulation systems may utilize frames of both fixed and variable size. In the implementation illustrated in FIG. 2, the frame sizes are fixed at 192 bytes and the TDMA header is 8 bytes long. This frame size corresponds with that of a TDMA network utilizing ¾ Rate Turbo Product Code (TPC) Forward Error Correction (FEC) with a 2K (2048 bit) block size. In the three frame sequence of the encapsulation stream 70 illustrated in FIG. 2, a 100 byte packet is followed by a 400 byte packet. As illustrated, the first control byte in frame 72 has a value of 100, indicating that the entire size of the data being transported in Packet 1 (100 bytes) is accommodated following the first control byte. The second control byte in frame 72 has a value of 0, indicating that the remaining space in the data payload following the second control byte will be taken up by data from Packet 2 and that the data will continue into the next frame. In frame 74, the control byte has a value of 0, indicating that the entire data payload following the control byte includes data from Packet 2 and that data from Packet 2 continues into the next frame. The first control byte in frame 76 has a value of 135, indicating that the final 135 bytes of data from Packet 2 (which was 400 bytes in size) is contained in the data payload of frame 76 following the first control byte. The second control byte value of 255 indicates that the remaining 47 bytes in the data payload of frame 76 will also have the value of 255, or null, as there is no additional data to send via frame 76. In the implementation illustrated in FIG. 2, the insertion of a single control byte every 254 bytes creates additional overhead as a result of the encapsulation of the packets within the stream of less than 0.4%.

Figure 3:
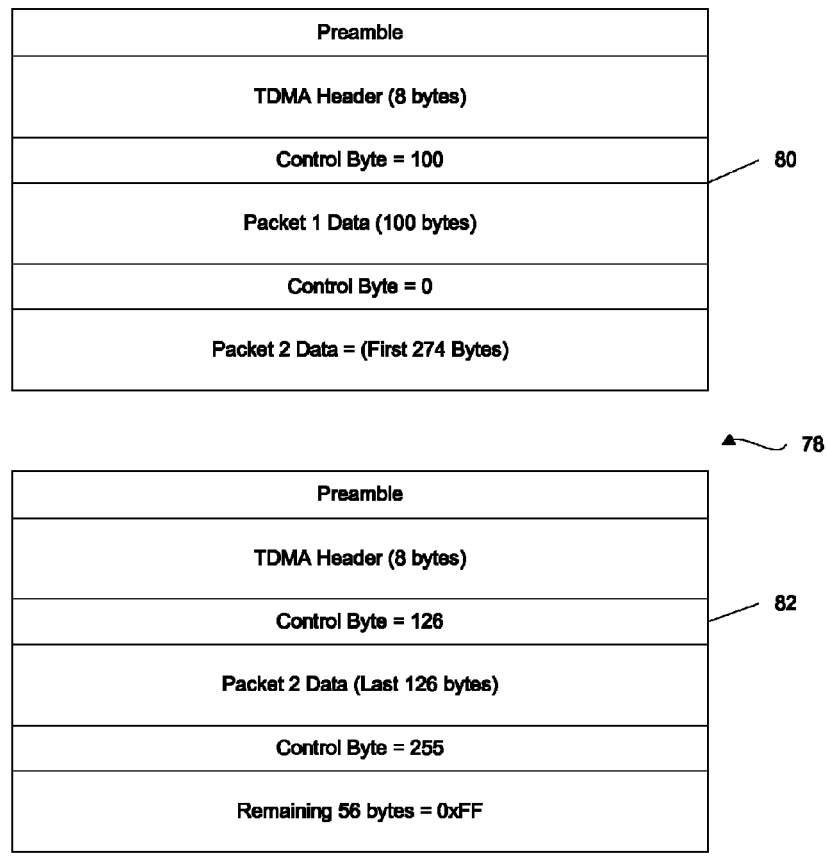
FIG. 3 is a diagram of another implementation of a first implementation of a frame showing other various uses of control bytes.

Referring to FIG. 3, an implementation of a portion of an encapsulated stream 78 with two frames 80 and 82 is illustrated. The encapsulated stream implementation 78 illustrated in FIG. 3 includes frames of variable size—two FEC block sizes are utilized, a 2K block size corresponding with frame 82 and a 4K block size corresponding with frame 80. The use of the 4K block size enables the transmission of 384 bytes per frame. As illustrated, the first frame includes a first control byte with a value of 100, indicating that all of the 100 bytes of data corresponding with Packet 1 follow the first control byte. The second control byte in frame 80 has a value of 0, indicating that the remaining 274 bytes of the data payload following the second control byte contain data from Packet 2 and that data from Packet 2 will be found in frame 82. In frame 82, the first control byte indicates that the last 126 bytes of Packet 2 follow the first control byte and the second control byte indicates that the remaining 56 bytes of frame 82 will correspond with its value 255 and be null values. The implementations illustrated in FIGS. 2 and 3 illustrate the principle of using of control bytes to encapsulate data packets of varying size in fixed size or variable size frames. When variable sized frames are used, those of ordinary skill in the art can appreciate how the need to utilize null values to fill unused space in the data payloads of the frames in the encapsulated stream may be reduced, and the overall data transport efficiency, utilization, and/or capacity of the telecommunication network increased.

The process of encapsulating the data packets included in the frame implementations illustrated in FIGS. 2 and 3 may be accomplished by any method disclosed in this document. The process of de-encapsulating the data packets may involve reversing any method disclosed in this document and/or reading in the data of each frame, identifying the control bytes, and recreating each encapsulated data packet by removing header information and using the control bytes to identify the location of the various portion(s) of each data packet. Those of ordinary skill in the art will readily be able to use the principles disclosed in this document to encapsulate data packets and de-encapsulate the corresponding encapsulated stream.

Figure 4:
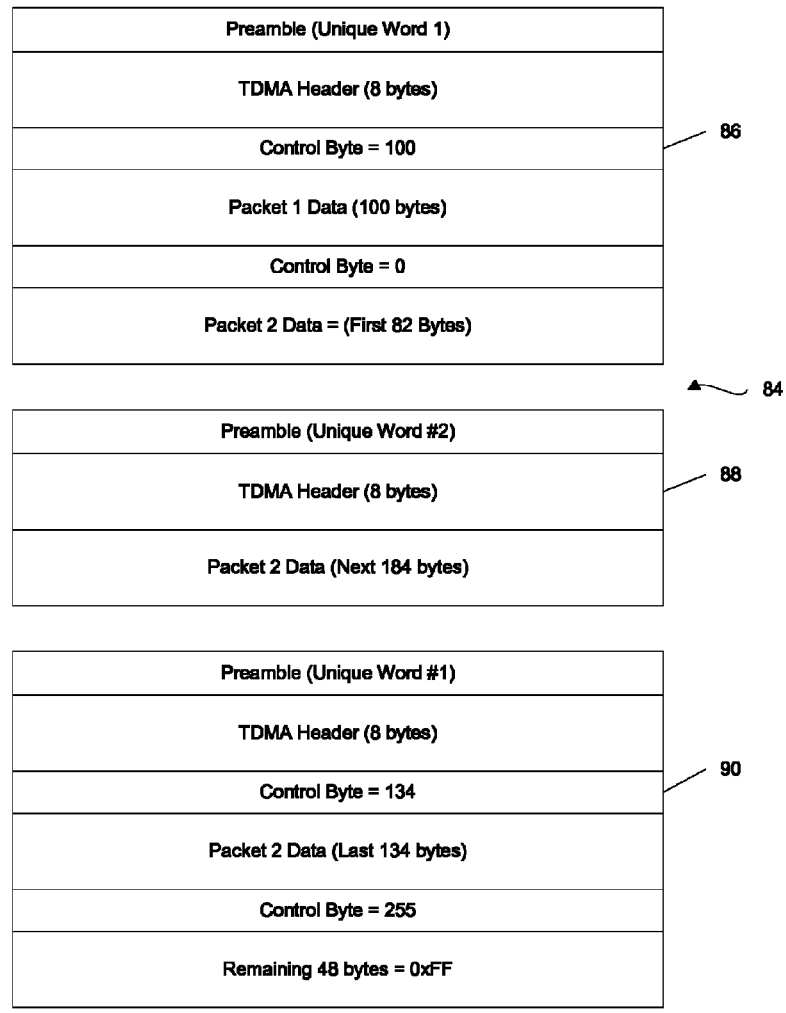
FIG. 4 is a diagram of an implementation of a first implementation of a frame showing the use of unique words in the preamble.

Referring to FIG. 4, an implementation of an encapsulation stream 84 with frames 86, 88, and 90 is illustrated. Frames 86, 88, and 90 are also frames corresponding with a first implementation of a frame that may be utilized by implementations of data encapsulation systems disclosed in this document. As illustrated, the preamble of frame 86 may include a first unique word that indicates that within the frame one or more control bytes may be included. When a frame's data payload will be completely filled with a single packet's data that continues from the previous frame, a second unique word may be used in the preamble, indicating that no control bytes will be included in the frame. In these implementations, the first unique word and the second unique word may also be called control byte indicators, because they indicate the presence or absence of control bytes within a given frame. Those of ordinary skill in the art can appreciate that a wide variety of unique words could be selected and used. In addition, a particular bit or field within the TDMA header could also be selected to indicate the presence and absence of a control byte in the frame. Each of these methods permits a reduction in the amount of additional bytes required to encapsulate a given amount of packet data, as the number of control bytes used can be reduced.

Figure 5A:
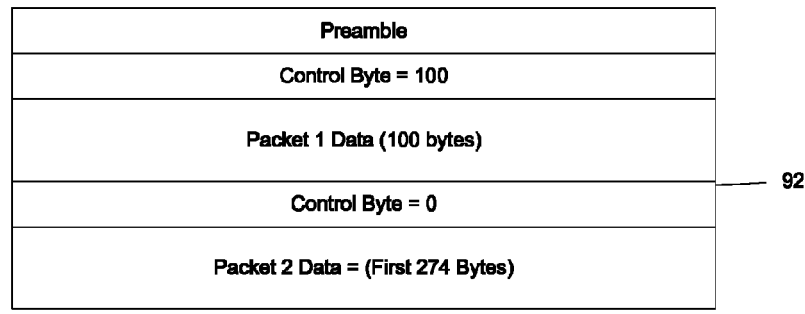
FIG. 5A is a diagram of an implementation of a first implementation of a frame without a header.
Figure 5B:
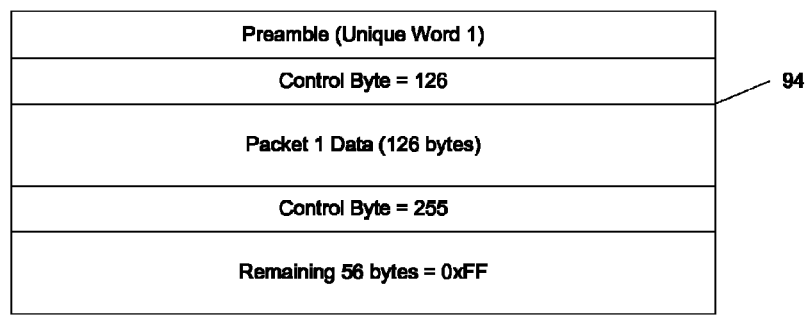
FIG. 5B is a diagram of an implementation of a first implementation of a frame without a header using a unique word.

Referring to FIG. 5A, an implementation of a first implementation of a frame 92 is illustrated. As illustrated, frame 92 does not include an explicit header section, but may utilize the preamble to transmit the required information about the frame to enable de-encapsulation and/or routing of the packet information included therein. Frame 92 illustrates how, in particular implementations, use of the control bytes alone is sufficient to successfully encapsulate packet information within frames and the routing of frame information may be accomplished by any of a wide variety of methods or algorithms that may or may not utilize headers or preambles. FIG. 5B illustrates how a packet implementation 94 like packet 92 of FIG. 5B may utilize a unique word as a control byte indicator while also not including a header section. These implementations illustrate how the use of control bytes with three values in implementations of data encapsulation systems and implementations of methods of data encapsulation encapsulates packet information in various frame implementations with or without requiring particular header or preamble structures or information.

Figure 6A:
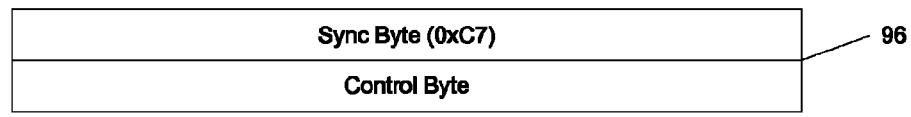
FIG. 6A is a diagram of an implementation of a second implementation of a frame showing a frame delimiter with a first value.

Referring to FIG. 6A, an implementation of a second implementation of a frame 96 is illustrated. As illustrated, the frame 96 includes a sync byte or frame delimiter that acts as a synchronization marker at predetermined positions within an encapsulation stream that allows the receiver to recover the byte orientation of the encapsulation stream. Any of a wide variety of sync byte values could be chosen or used in various implementations of the encapsulation stream. Like the implementations in FIGS. 5A and 5B, the sync byte value used may not change from frame to frame if control bytes are present or absent in each frame. In these implementations, the control bytes are sufficient to perform the data encapsulation. In other implementations, the sync byte values may be varied so that the sync bytes can act as control byte indicators. In these implementations, the overhead of the encapsulation process may be reduced as some control bytes may not need to be included in particular frames to allow the receiving side to know how to reconstruct the encapsulated packets.

Figure 6B:
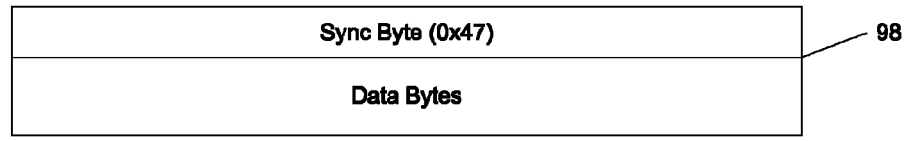
FIG. 6B is a diagram of an implementation of a second implementation of a frame showing a frame delimiter with a second value.
Figure 7A:
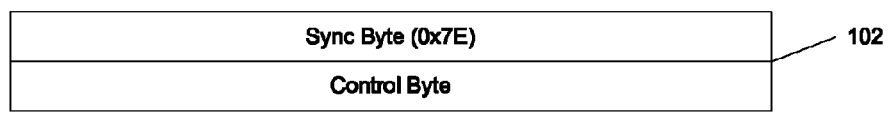
FIG. 7A is a diagram of an implementation of a second implementation of a frame showing a frame delimiter with a first value different from the first value illustrated in FIG. 6A.
Figure 7B:
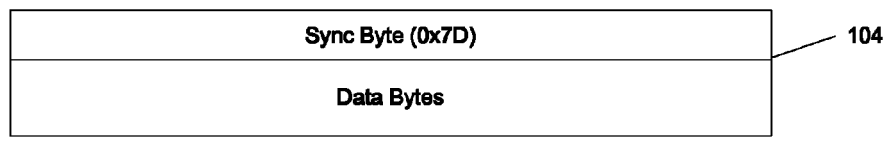
FIG. 7B is a diagram of an implementation of a second implementation of a frame showing a frame delimiter with a second value different from the second value illustrated in FIG. 6B.

Referring to FIGS. 6A and 6B, the values chosen for the sync bytes in the frame implementations 96, 98 illustrated are 0xC7 (11000111) and 0x47 (01000111) represent a set of values where the Most Significant Bit (MSB) is changed to indicate whether a control byte is present following the sync byte. Any particular signaling bit within the sync byte could be used in particular implementations or the sync byte itself could be inverted. For example, the values could also be 0x1B and 0x9B, or 1x1B and 0xE4 if the Least Significant Bit (LSB) is utilized. In some implementations, a single nibble (or half octet) could be used as the marker for synchronization while the remaining four bits may be used to indicate the presence or absence of control bytes. Referring to FIGS. 7A and 7B, examples of frames 102, 104 with sync bytes with values of 0x7E (01111110) and 0x7D (01111101) are illustrated. In this case, the choice of the values 0x7E and 0x7D are the same numerically as the value of 0x7E used as the flag byte value in High-Level Data Link Control (HDLC) framing and the 0x7E flag byte value and substitution indicator of 0x7D used in Point-to-Point Protocol (PPP) in HDLC-like framing (Internet Engineering Task Force RFC 1662). While the particular byte values are the same, the way that these values are used in implementations of data encapsulation systems and methods of data encapsulation disclosed in this document are different.

Figure 6C:
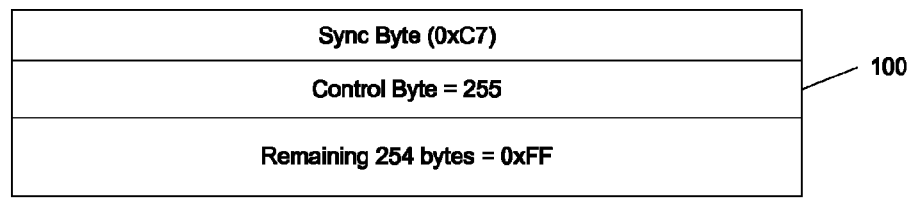
FIG. 6C is a diagram of an implementation of a second implementation of a frame with null values.
Figure 7C:
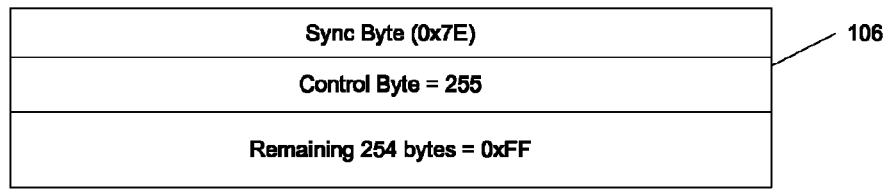
FIG. 7C is a diagram of an implementation of a second implementation of a frame with null values.

In the implementations illustrated in FIGS. 6A and 6B, 0xC7 is used to represent when a control byte is present in the frame and 0x47 is used to represent when a control byte is not present in the frame. In the implementations illustrated in FIGS. 7A and 7B, 0x7E is used to represent the presence of a control byte while 0x7D is used to indicate the absence of a control byte. While in the implementations illustrated in FIGS. 6A and 7A the control byte appears immediately after the synchronization byte, in particular implementations, the control byte may be separated from the synchronization byte in the data sequence of the frame. Also, as illustrated in FIGS. 6C and 7C, the frames 100, 106 may utilize control bytes with the same three values discussed previously including where the control byte takes on the value 255 and the values of the data in the data payload correspond with that value and are null.

Figure 8:
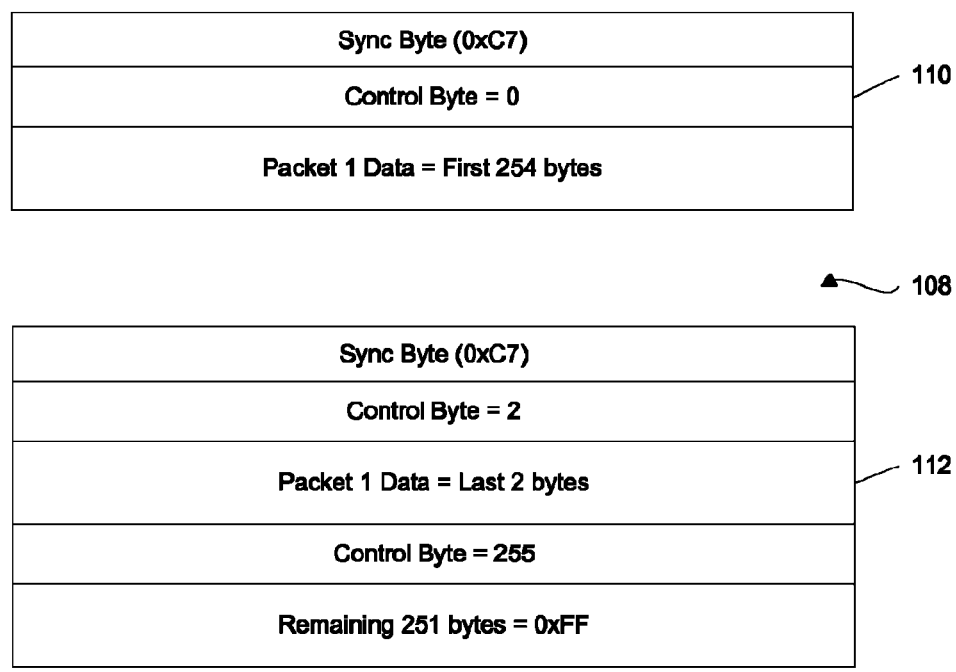
FIG. 8 is a diagram of an implementation of a second implementation of a frame showing various uses of control bytes.

Referring to FIG. 8, an implementation of an encapsulation stream 108 with two frames 110 and 112 corresponding with a second implementation of a frame utilized by implementations of data encapsulation systems is illustrated. As illustrated, the value of the sync byte in frame 110 is 0xC7, indicating that a control byte will be included in the frame. The value of the control byte is 0, indicating that the data of Packet 1 will continue into the data payload of at least the subsequent frame 112. The value of the sync byte is 0xC7 for frame 112, indicating that at least one control byte will also be included in the frame 112. As was discussed previously, the first control byte in frame 112 illustrates a control byte with a second value, where the second value, 2, is the size of the data in the data payload of the frame that is from Packet 1. The second control byte in frame 112 has a control byte with a third value, where the value of the control byte, 225, corresponds with the actual null value of the bytes in the data payload following the control byte.

Figure 9:
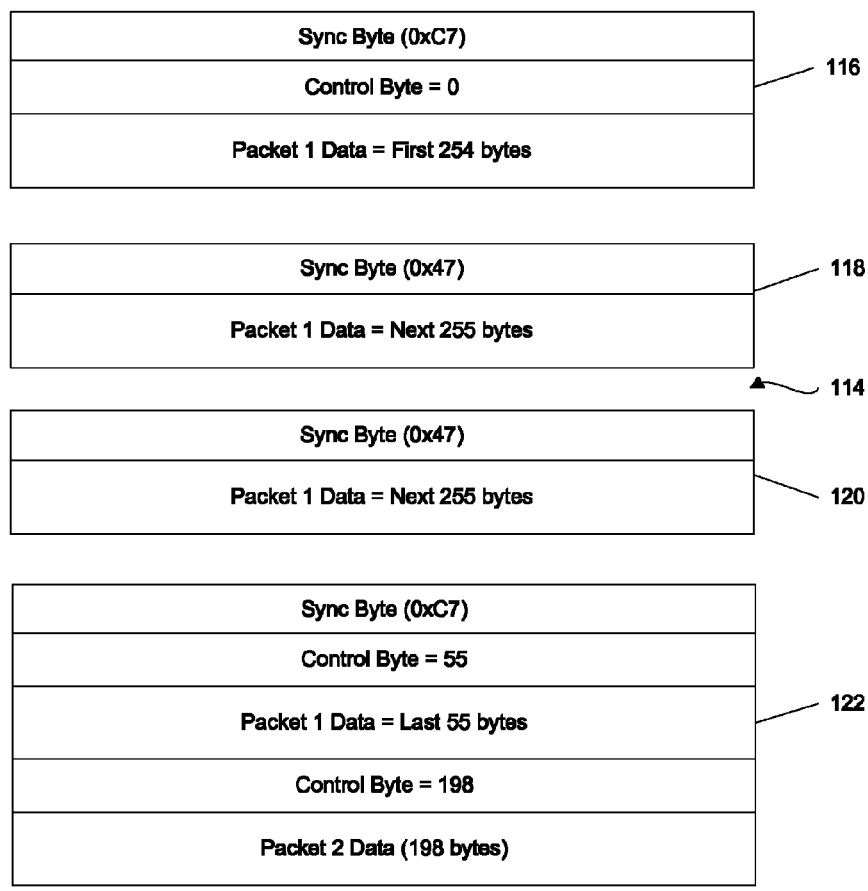
FIG. 9 is a diagram of an implementation of a second implementation of a frame showing other various uses of control bytes.

Referring to FIG. 9, another implementation of an encapsulation stream 114 is illustrated with frames 116, 118, 120, and 122 corresponding with second implementations of a frame utilized by implementations of data encapsulation system. As illustrated, the frame 116 has a sync byte with a value of 0xC7, indicating that a control byte is included in the frame. Frames 118 and 120 have sync bytes with a value of 0x47, indicating that control bytes are not included in the frames (and allowing the savings of two bytes of data between the two frames). Frame 122 has a sync byte value of 0xC7, indicating that at least one control byte is included in the frame. As illustrated, the second control byte indicates that the rest of the frame (198 bytes) is completely filled by data from Packet 2, and no null values are required. In the implementations of encapsulation streams 108, 114 illustrated in FIGS. 8 and 9, the frames have a fixed frame size; in other particular implementations, as was previously discussed for first implementations of frames, the frame sizes may vary.

Figure 10:
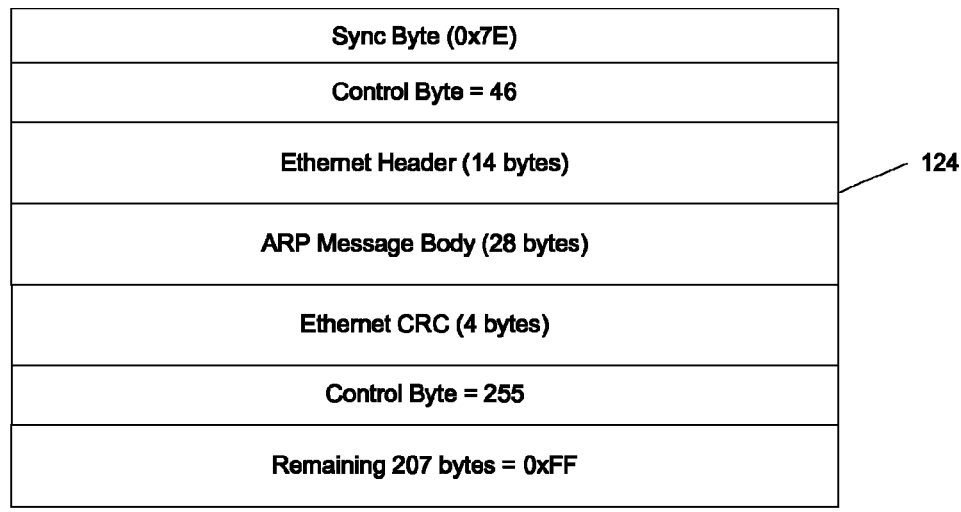
FIG. 10 is a diagram of an implementation of a second implementation of a frame showing an Address Resolution Protocol (ARP) packet encapsulated within the frame.

Referring to FIG. 10, an implementation of a frame 124 corresponding with a second implementation of a frame utilized by data encapsulation systems is illustrated. While the previous figures in this document have represented the encapsulated data packets generically (Packet 1, Packet 2, etc.), in the implementation illustrated in FIG. 10, the contents of the packet encapsulated within frame 124 is displayed. Within the data payload of frame 124 is included an Address Resolution Protocol (ARP) packet, that includes an Ethernet header portion, an ARP message body, and an Ethernet Cyclical Redundancy Check (CRC) portion. As can be observed, when the frame is processed by a de-encapsulation module, all of the portions of the ARP packet will be able to be retrieved intact and sent to the destination specified in the ARP packet's own header.

Figure 11:
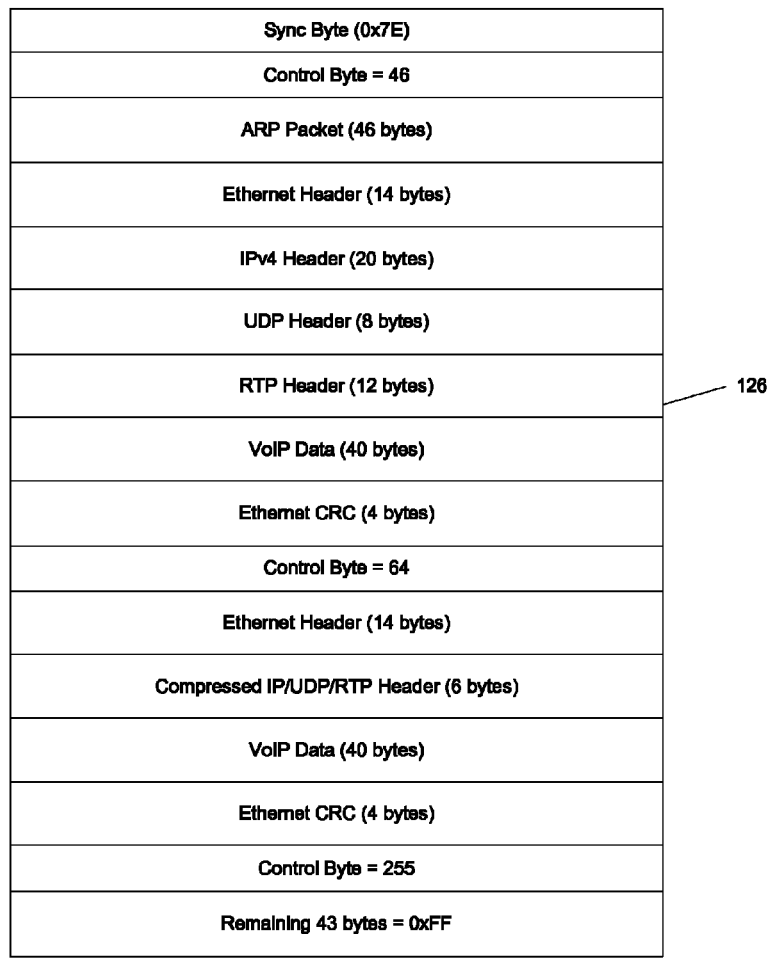
FIG. 11 is a diagram of an implementation of a second implementation of a frame illustrating an ARP packet followed by two Internet Protocol version 4 (IPv4) Voice Over Internet Protocol (VoIP) packets encapsulated within the frame.
Figure 12:
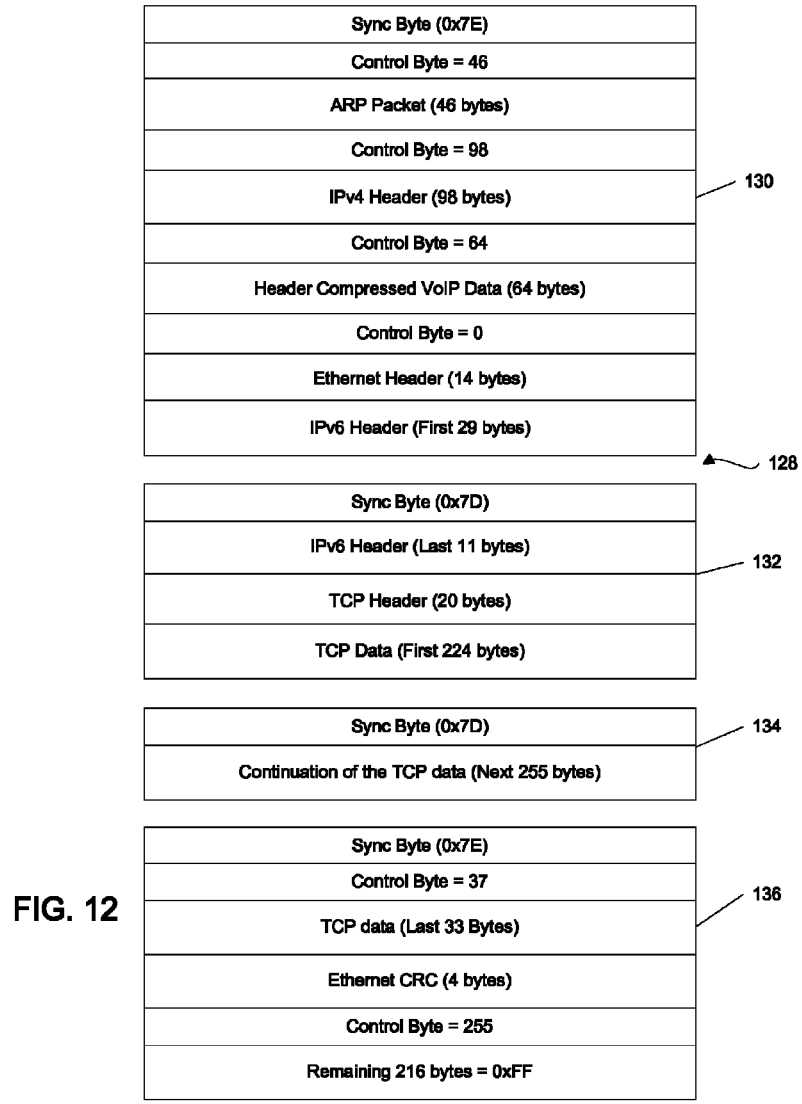
FIG. 12 is a diagram of an implementation of a second implementation of a frame illustrating an ARP, IPv4 VoIP, and an Internet Protocol version 6 (IPv6) Transmission Control Protocol/Internet Protocol (TCP/IP) packet encapsulated in multiple frames.

Any datagram capable of resolution into packet form could be encapsulated using implementations of data encapsulation methods and systems disclosed in this document. Referring to FIG. 11, multiple packet types may be included within a single frame 126. Frame 126 is a frame corresponding with second implementations of frames utilized by data encapsulation systems disclosed in this document. Here an ARP packet followed by two Internet Protocol version 4 (IPv4) Voice Over Internet Protocol (VoIP) packets are encapsulated within the same frame. Between each of the packet types is a control byte, indicating how much of the data payload includes the data for the specific packet type. Because the actual internal format of the data packet is independent of the encapsulation methods and systems disclosed in this document, packets with different header formats and data structures can be encapsulated within the same frame. For example, the second VoIP IPv4 packet encapsulated within frame 126 is utilizing a compressed Real Time Protocol (RTP) header, while the first is using an uncompressed RTP header. In addition, referring to FIG. 12, an implementation of an encapsulated stream 128 may be able to successfully encapsulate multiple packets across multiple frames 130, 132, 134, and 136 using the sync byte values to indicate the presence and absence of control bytes within the frame. Here ARP, IPv4 VoIP, and Internet Protocol version 6 (IPv6) Transmission Control Protocol/Internet Protocol (TCP/IP) packets are encapsulated across the four frames. Those of ordinary skill in the art will appreciate how any of a wide variety of data packet types may be encapsulated using the principles disclosed in this document.

Figure 13A:
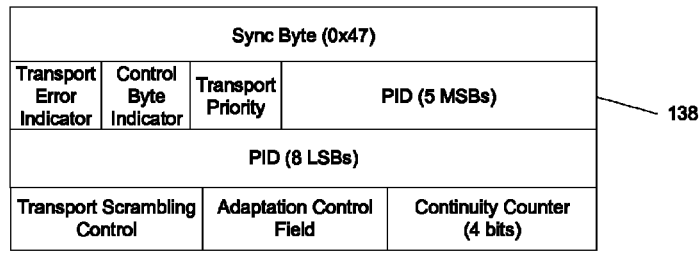
FIG. 13A is a diagram of an implementation of a third implementation of a frame including a header with a field mapped to values of a control byte indicator.
Figure 13B:
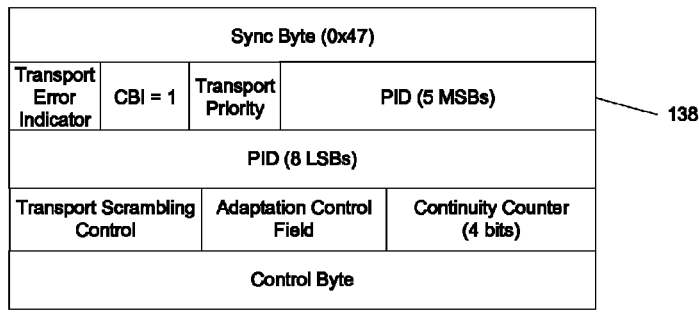
FIG. 13B is a diagram of an implementation of a third implementation of a frame where the control byte indicator is set to a first value.
Figure 13C:
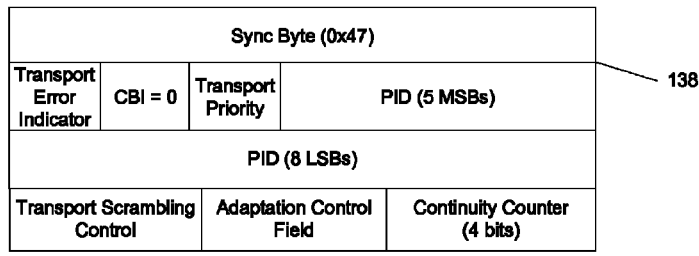
FIG. 13C is a diagram of an implementation of a third implementation of a frame where the control byte indicator is set to a second value.

Referring to FIG. 13A, an implementation of a frame 138 corresponding with a third frame implementation utilized by implementations of data encapsulation systems disclosed in this document is illustrated. As illustrated, frame 138 includes a sync byte and a header with one or more fields. Frame 138 contains a wide variety of fields that contain bit values that allow the frame to be properly identified, routed, processed, and any other desired system function to be performed. As illustrated, one of the fields in the frame is mapped to, or corresponds with, the value of a control byte indicator. Referring to FIG. 13B, as illustrated, when the value of the control byte indicator is one, one or more control bytes follow the header in the data sequence of the frame 138. Referring to FIG. 13C, as illustrated, when the value of the control byte indicator is zero, no control bytes will be present in the data sequence of the frame following the header. In third implementations of frames, the values of the control byte indicator mapped to the control byte indicator field in the header act like the sync byte values in second implementations of frames and the unique words in first implementations of frames disclosed in this document. Frame 138 is a Motion Picture Experts Group (MPEG) frame, and the header field mapped to values of the control byte indicator is the header field conventionally used for the Payload Unit Start Indicator (PUSI) value. In the implementation illustrated in FIGS. 13A, B, and C, the control byte indicator field consists of a single bit value that is either zero or one.

In other particular implementations of third implementations of frames utilized by data encapsulation systems disclosed in this document, any other header field or other portion of a frame could be used as a control byte indicator to show the presence or absence of a control byte in the frame. In some implementations, the use of a control byte indicator may not be used, and control bytes alone may be used to encapsulate the data. In addition, third implementations of frames may be either fixed or variable in size. The use of MPEG frames in this document is for the exemplary purposes of this disclosure and those of ordinary skill in the art will readily be able to apply the principles disclosed to other frame formats and types.

Figure 14:
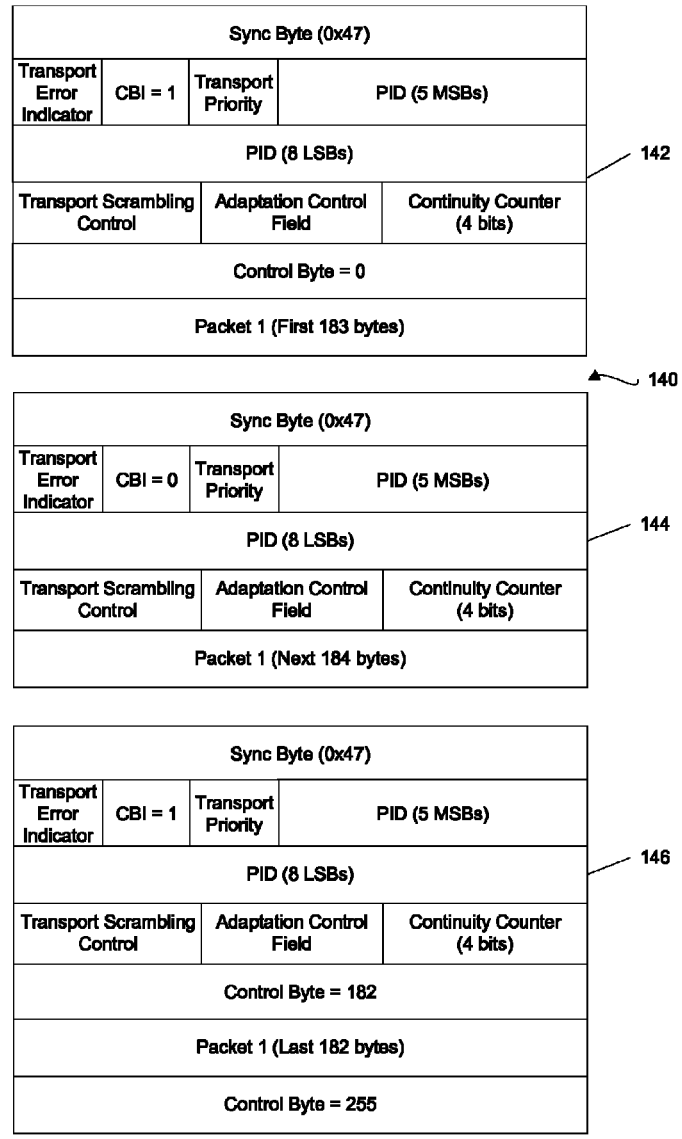
FIG. 14 is a diagram of an implementation of a third implementation of a frame illustrating various uses of control bytes.

Referring to FIG. 14, an implementation of an encapsulated stream 140 is illustrated including frames 142, 144, and 146 corresponding with third implementations of frames utilized by data encapsulation systems disclosed in this document. As illustrated, the control bytes may take on any of the three values previously discussed in this document, and may be included in each frame as has been previously discussed. Whether one or more control bytes are present in the frame or not is indicated by the value of the control byte indicator. As illustrated, the control byte indicator value is equal to one for frame 142; accordingly, a control byte is included following the header. For frame 144, however, the control byte indicator value is zero, indicating that no control byte will be included in the frame because the data from Packet 1 will completely fill the data payload of frame 144. In frame 146, the control byte indicator value is one, indicating that at least one control byte will be included. Frame 146 also illustrates how, when only a single byte is left in a frame, the control byte can be used to fill the single byte and turn it to a null (255) value.

Figure 15:
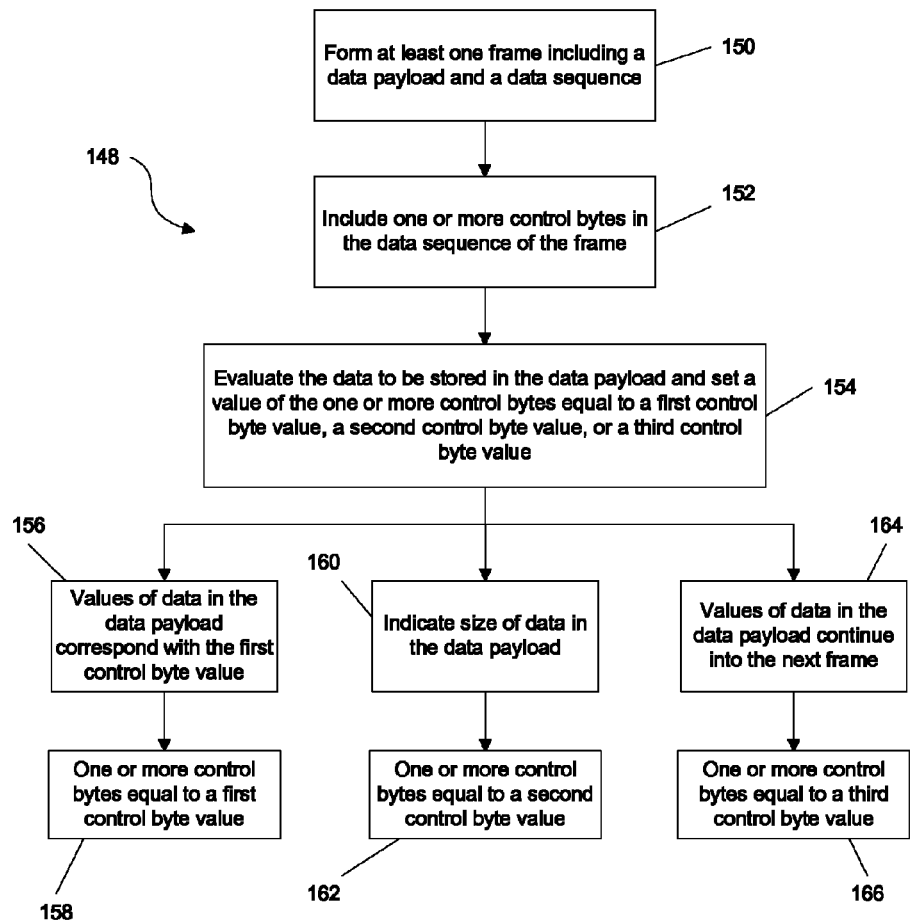
FIG. 15 is a flowchart of an implementation of a first method of data encapsulation.

Any of a wide variety of data encapsulation methods may be utilized by implementations of data encapsulation systems. Referring to FIG. 15, an implementation of a first method of data encapsulation 148 is illustrated. As illustrated, the method 148 includes forming at least one frame including a data payload and a data sequence (step 150) and including one or more control bytes in the data sequence of the frame (step 152). The method 148 also includes evaluating the data to be stored in the data payload and setting a value of the one or more control bytes equal to a first control byte value, a second control byte value, or a third control byte value (step 154). In implementations of the method 148, whether a particular control byte is set to a first, second, or third value is based on specific logic. If the values of the data in the data payload correspond with the first control byte value (step 156), then the one or more control bytes will be set to the first control byte value (step 158). If the control byte is to indicate the size of the data in the data payload (step 160, i.e., when the data from a packet can be fully contained within the frame), then the one or more control bytes will be set to the second control byte value (step 162). If the values of data in the data payload will continue into the data payload of at least a next frame (step 164), then the one or more control bytes will be set equal to a third control byte value (step 166).

In particular implementations of the method 148, a header may be included in the frame and including one or more control bytes in the data sequence of the frame may further include mapping one of one or more fields included in the header to a value of a control byte indicator and setting the value of the control byte indicator to a first value indicating that a control byte will exist or setting the value of the control byte indicator to a second value, different from the first value, indicating that a control byte will not exist in the frame. In these implementations, the method 148 may also include including the one or more control bytes in the data sequence of the frame following the header if the value of the control byte indicator is equal to the first value. In particular implementations, the value of the control byte indicator may be set to one or to zero.

Figure 16:
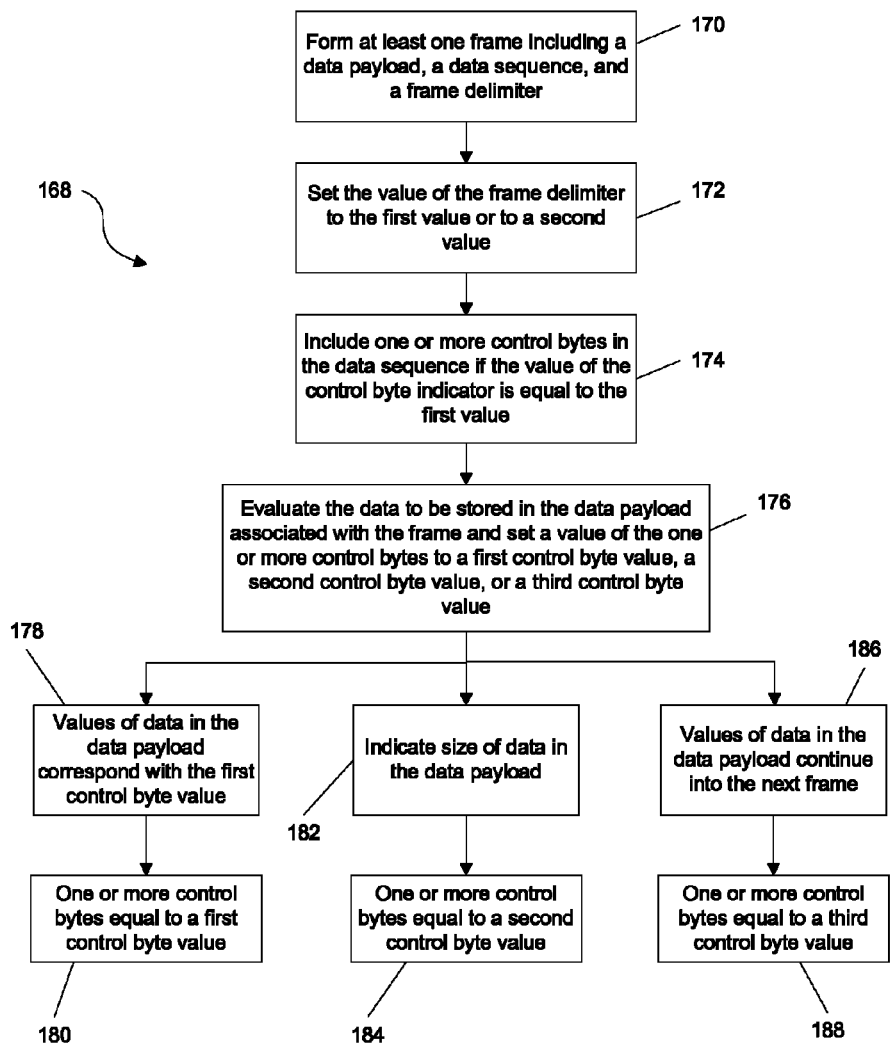
FIG. 16 is a flowchart of an implementation of a second method of data encapsulation.

Referring to FIG. 16, an implementation of a second method of encapsulating data 168 is illustrated. As illustrated, the method 168 may include forming at least one frame including a data payload, a data sequence, and a frame delimiter (step 170), setting the value of the frame delimiter to the first value or to a second value (step 172), and including one or more control bytes in the data sequence of the frame if the value of the control bye indicator is equal to the first value (step 174). The method 168 also includes evaluating the data to be stored in the data payload associated with the frame and setting a value of the one or more control bytes to a first control byte value, a second control byte value, or a third control byte value (step 176). Whether the value of the one or more control byte values takes on the first, second, or third control byte value depends upon specific logic. If the values of the data payload are to or correspond with the first control byte value (step 178), then the one or more control bytes are set to the first control byte value (step 180). If the one or more control bytes are to indicate the size of data in the data payload (step 182), then the one or more control bytes are set to the second control byte value (step 184). If the values of the data in the data payload of the frame will continue into at least the next frame (step 186), then the one or more control bytes will be set to the third control byte value (step 188). In particular implementations of the method, the values of the first value of the frame delimiter may be 0xC7 (11000111) or 0x7E (01111110) while the values of the second value of the frame delimiter may be 0x47 (01000111) or 0x7D (01111101).

Figure 17:
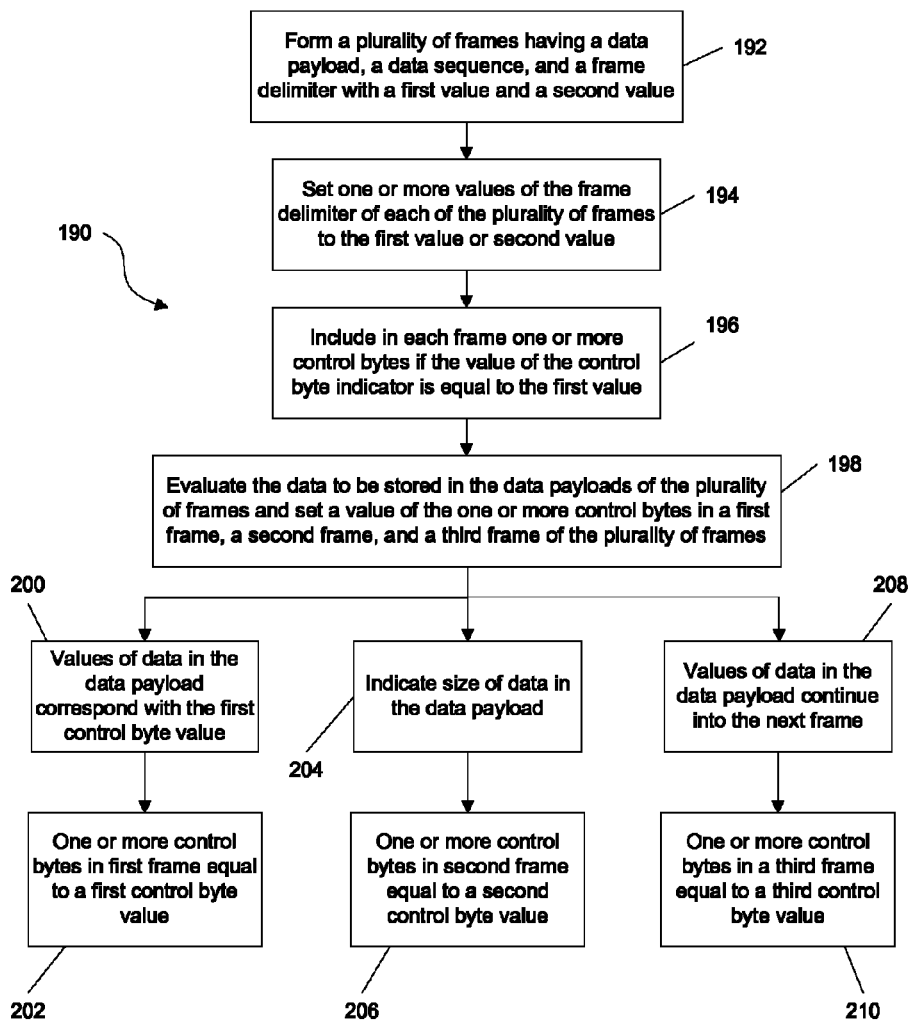
FIG. 17 is a flowchart of an implementation of a third method of data encapsulation.

Referring to FIG. 17, an implementation of a third method of encapsulating data 190 is illustrated. As illustrated, the method 190 includes forming a plurality of frames having a data payload, a data sequence, and a frame delimiter with a first value and a second value (step 192) and setting one or more values of the frame delimiter of each of the plurality of frames to the first value or to the second value (step 194). The method also includes including in each frame one or more control bytes if the value of the control byte indicator is equal to the first value (step 196). The method includes evaluating the data to be stored in the data payloads of the plurality of frames and setting a value of the one or more control bytes in a first frame, a second frame, and a third frame of the plurality of frames (step 198). What the value of the one or more control bytes in each frame will be is determined according to specific logic. If the values of the data in the data payload correspond with the first control byte value (step 200), then the one or more control bytes in the first frame will be set to a first control byte value (step 202). If the size of the data in the data payload of the second frame is to be indicated (step 204), then the one or more control bytes in the second frame will be set equal to a second control byte value (step 206). If the values of the data in the data payload continue into the next frame (step 208), then the one or more control bytes in the third frame may be set equal to a third control byte value (step 210).

Figure 18:
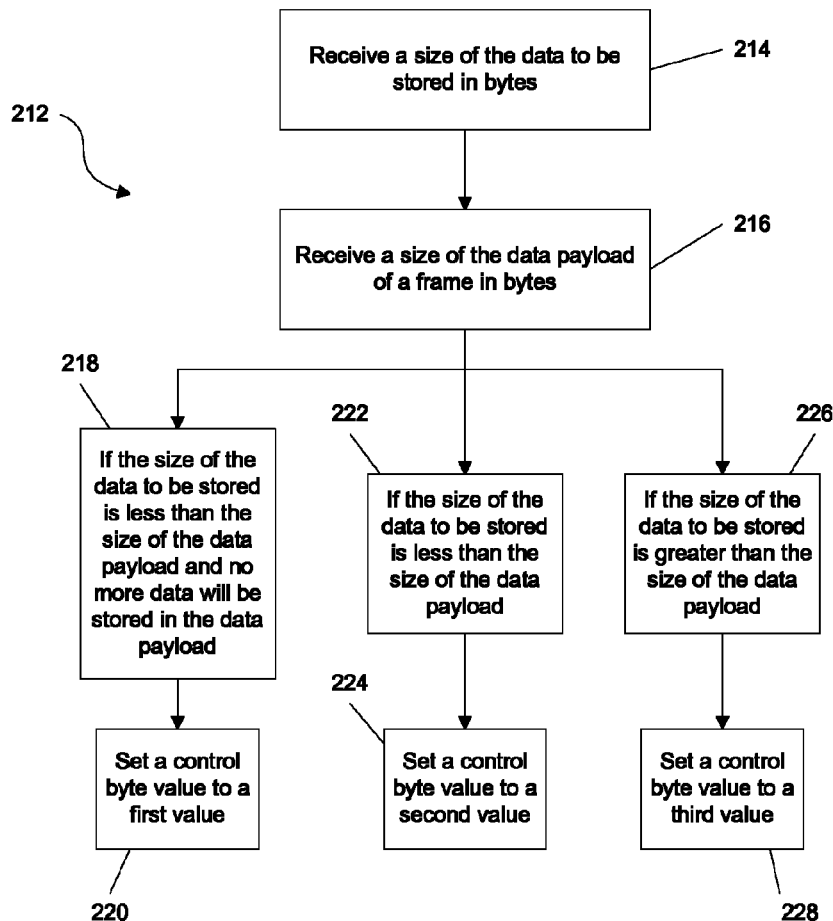
FIG. 18 is a flow chart of an implementation of a method of evaluating data for a method of data encapsulation.

Referring to FIG. 18, an implementation of a method of evaluating data for a method of data encapsulation 212 is illustrated. As illustrated, the method 212 includes receiving a size of the data to be stored in bytes (step 214) and receiving a size of the data payload of a frame in bytes (step 216). If the size of the data to be stored is less than the size of the data payload and no more data will be stored in the data payload of the frame (step 218), then a control byte value will be set to a first value (step 220). If the size of the data to be stored is less than the size of the data payload (step 222), then a control byte value will be set to a second value (step 224). If the size of the data to be stored is greater than the size of the data payload (step 226), then a control byte value will be set to a third value (step 228). In particular implementations, the first control byte value may be 255 (0xFF), the second control byte value may be the size of the data to be stored in bytes, and the third control byte value may be 0 (0x00) and the method may further include setting the values of the control bytes to these values.

Implementations of data encapsulation systems and implementations of data encapsulation disclosed in this document may enable various implementations of methods of encapsulation error detection. Because the position of the control bytes and the values that the control bytes take on should correspond with the subsequent packet data values in each frame, when a mismatch between the two is encountered, the receiver side of the data encapsulation system immediately is made aware that one or more errors are present in the frame, either with the control byte or with the packet data in the frame. Those of ordinary skill in the art will immediately appreciate how this information could be incorporated in a wide variety of error correction and detection methods. Because the control bytes are already present in the frame structure, no additional bytes need to be added to the frame to achieve the error detection, which makes the error detection capability provided basically "free."

Implementations of de-encapsulation modules may be able to detect errors in the control bytes themselves by comparing the control byte value with the data following the control byte. For example, if a control byte was supposed to take on the null value, 255, but instead had been corrupted to the value 127, comparing the subsequent data values following the control byte (which would all be null and would be unlikely to number exactly 127 bytes) would immediately indicate that the control byte value was erroneous. Single bit errors in the control byte can be detected in the same manner—if a control byte has the value of 128 but only 125 bytes remain in the frame, the de-encapsulation module will immediately know that the control byte value is in error. If the control byte was supposed to take on the value of zero, indicating that the data will continue into at least the next frame, but instead has a value of 4 (also a single bit error), the de-encapsulation module will be able to quickly determined that the control byte value is in error when no four byte packet data sections can be observed in the current frame.

Those of ordinary skill in the art will be able to readily determine methods for determining whether it is the data in the frame that is corrupt, and not the control bytes. A simple example is that if a data byte is missing from the packet information, the total frame size will not be what is expected, and potentially will also not correspond with the size of the data specified by the control byte value. In these cases, the de-encapsulation module would be able to quickly determine that it is most likely that the error is with the packet data rather than with the control byte and respond accordingly. A wide variety of other error detection algorithms are possible using the principles disclosed herein.

Implementations of de-encapsulation modules may take any of a wide variety of actions in response to determining that corruption in a particular frame has been detected. Those of ordinary skill in the art will readily appreciate the wide variety of ways an error could be handled using the principles disclosed in this document. For example, if an error is detected in the frame, the remaining data in the frame could be simply discarded and the decoding or de-encapsulation process restarted at the next preamble or sync byte. Another method would be to continue processing the remaining data in the frame as though it were all part of the same packet and continue processing at the start at the next frame. Because in all cases of error the decoder or de-encapsulation process will resynchronize at the start of the next valid frame, the impact of an error in a particular frame may be fairly minimal and in some implementations, merely discarding the entire frame may be sufficient.

In places where the description above refers to particular implementations of data encapsulation systems and related methods, it should be readily apparent that a number of modifications may be made without departing from the spirit thereof and that these implementations may be applied to other data encapsulations systems and related methods.

What is claimed is:

1. A method of data encapsulation comprising:
    forming, using an encapsulation module of a transmission device, at least one frame comprising a data payload configured to store data and a data sequence for transmission by the transmission device across a telecommunication channel;
    including, by the encapsulation module, one or more control bytes in the data sequence of the at least one frame; and
    evaluating the data to be stored in the data payload associated with the frame and setting a value of the one or more control bytes in response to the data evaluation, wherein the value of the one or more control bytes is equal to one of:
        a first control byte value to indicate that one or more values of the data in the data payload following the control byte in the data sequence of the frame corresponds with the first control byte value;
        a second control byte value to indicate a size of the data in the data payload following the control byte in the data sequence of the frame; and
        a third control byte value to indicate whether one or more values of the data continue into a data payload of at least a next frame;
    wherein the value of each one of the one or more control bytes for each of the at least one frame is equal to either the first control byte value, the second control byte value, or the third control byte value.

2. The method of claim 1, wherein including one or more control bytes in the data sequence of the frame further comprises:
    mapping one of one or more fields included in a header included in the frame to a value of a control byte indicator;
    setting the value of the control byte indicator to a first value to indicate that a control byte will exist or to a second value, different from the first value, to indicate that a control byte will not exist; and
    including the one or more control bytes in the data sequence of the frame following the header if the value of the control byte indicator is equal to the first value.

3. The method of claim 2, wherein setting the value of the control byte indicator further comprises setting the first value of the control byte indicator to one and the second value of the control byte indicator to zero.

4. A method of evaluating data for a method of data encapsulation comprising:
    receiving, by a receiving device of a data encapsulation system, a size of the data to be stored in bytes;
    receiving, by the receiving device, a size of the data payload of a frame in bytes;
    if the size of the data to be stored is less than the size of the data payload and no more data will be stored in the data payload, setting a value of a control byte to a first control byte value and including the control byte in the data payload to indicate that one or more values of the data in the data payload following the control byte correspond with the first control byte value;
    if the size of the data to be stored is less than the size of the data payload, setting the value of the control byte to a second control byte value indicating the size of the data in the data payload and including the control byte in the data payload; and
    if the size of the data to be stored is greater than the size of the data payload, setting a value of a control byte to a third control byte value and including the control byte in the data payload to indicate that one or more values of the data in the data payload continue into a data payload of at least a next frame.

5. The method of claim 4, wherein setting the value of the control byte further comprises setting the first control byte value to 255 (0xFF), setting the second control byte value to the size of the data in bytes, and setting the third control byte value to 0 (0x00).

6. A method of data encapsulation comprising a frame structure adapted for transporting data across a telecommunication channel, the method comprising:
    generating, with an encapsulation module of a transmission device, at least one frame structure comprising a data sequence, a data payload comprising data values, and a control byte;
    evaluating data to be stored in the data payload associated with the at least one frame and setting a plurality of values of the control byte such that:
        the control byte has a first value indicating that the values of data in the data payload correspond with the first value;
        the control byte has a second value indicating a size of the data in the data payload following the control byte in the data sequence of the frame; and
        the control byte has a third value indicating that the values of the data continue into a data payload of a next frame when the control byte is received by a receiver.
    wherein the values of the control byte for each of the at least one frame is equal to either the first value, the second value, or the third value.

7. The method of claim 6, further comprising generating, with the encapsulation module of the transmission device, a header having one or more fields and a control byte indicator having a first value and a second value, wherein the value of the control byte indicator is mapped to one of the one or more fields;
    wherein when the control byte indicator is set to a first value, a control byte is included within the frame after the control byte indicator in the data sequence of the frame; and
    wherein when the control byte indicator is set to a second value, a control byte is not included within the data sequence of the frame.

8. The method of claim 7, wherein the first value of the control byte indicator is one and wherein the second value of the control byte indicator is zero.

9. The method of claim 7, wherein the control byte indicator comprises a single bit value and is comprised within a Payload Unit Start Indicator field comprised in the header.

10. The method of claim 7, wherein the control byte indicator is a frame delimiter configured to indicate the beginning of the frame.

11. The method of claim 10, wherein the first value of the control byte indicator is 0xC7 (11000111) and the second value of the control byte indicator is 0x47 (01000111).

12. The method of claim 10, wherein the first value of the frame delimiter is 0x7E (01111110) and the second value of the frame delimiter is 0x7D (01111101).

13. The method of claim 6, wherein the frame is a Motion Picture Experts Group (MPEG) frame.

14. The method of claim 6, wherein expected length values of the control byte include 1 to 183, 0, and 255 and wherein unexpected length values of the control byte include 184 to 254.

15. The method of claim 6, wherein the first value of the control byte is 255 (0xFF), the second value of the control byte is the size of the data in bytes, and the third value of the control byte is 0 (0x00).

* * * * *